United States Patent
Hartmann et al.

(10) Patent No.: US 10,471,811 B2
(45) Date of Patent: Nov. 12, 2019

(54) METHOD FOR OPERATING A MOVING DEVICE

(71) Applicant: AUDI AG, Ingolstadt (DE)

(72) Inventors: Jürgen Hartmann, Gutenstetten (DE); Patrick Sassmannshausen, Böhmfeld (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/528,400

(22) PCT Filed: Nov. 24, 2015

(86) PCT No.: PCT/EP2015/002358
§ 371 (c)(1),
(2) Date: May 19, 2017

(87) PCT Pub. No.: WO2016/082929
PCT Pub. Date: Jun. 2, 2016

(65) Prior Publication Data
US 2017/0334272 A1    Nov. 23, 2017

(30) Foreign Application Priority Data

Nov. 27, 2014  (DE) .......... 10 2014 017 576

(51) Int. Cl.
*B60J 5/10*        (2006.01)
*E05F 15/611*      (2015.01)
*E05F 15/73*       (2015.01)

(52) U.S. Cl.
CPC ........... *B60J 5/104* (2013.01); *B60J 5/10* (2013.01); *E05F 15/611* (2015.01); *E05F 15/73* (2015.01);
(Continued)

(58) Field of Classification Search
CPC .......... E05Y 2900/55; E05Y 2900/106; H02H 7/0851
(Continued)

(56) References Cited

U.S. PATENT DOCUMENTS

| 4,678,975 A | * | 7/1987 | Vrabel | E05F 15/695 |
| | | | | 318/256 |
| 4,831,509 A | * | 5/1989 | Jones | H02H 7/0851 |
| | | | | 318/266 |

(Continued)

FOREIGN PATENT DOCUMENTS

| CN | 1707376 | 12/2005 |
| DE | 196 41 428 C1 | 2/1998 |

(Continued)

OTHER PUBLICATIONS

English translation of the International Preliminary Report on Patentability dated Jun. 1, 2017 from International Patent Application No. PCT/EP2015/002358, 6 pages.

(Continued)

*Primary Examiner* — Rina I Duda
(74) *Attorney, Agent, or Firm* — Staas & Halsey LLP

(57) ABSTRACT

A movable component of a motor vehicle, for example a tailgate can be moved between two end positions by a drive unit of a moving device. A release energy for the drive unit, which is to be used to release the component at the start of a movement from a starting position, is selected as a function of the starting position.

16 Claims, 3 Drawing Sheets

(52) U.S. Cl.
CPC ....... *E05Y 2400/31* (2013.01); *E05Y 2400/60* (2013.01); *E05Y 2900/546* (2013.01)

(58) Field of Classification Search
USPC ........ 318/280, 283, 186, 466, 468, 461, 432
See application file for complete search history.

(56) References Cited

U.S. PATENT DOCUMENTS

| | | | | |
|---|---|---|---|---|
| 5,563,483 | A * | 10/1996 | Kowall | E05B 81/14 318/266 |
| 5,917,296 | A * | 6/1999 | Frey | H02P 7/2913 318/257 |
| 5,969,302 | A * | 10/1999 | Nishizawa | B60P 1/4471 187/240 |
| 5,982,126 | A * | 11/1999 | Hellinga | B60J 5/06 318/286 |
| 6,034,497 | A * | 3/2000 | Tamagawa | H02H 7/0851 318/266 |
| 6,249,097 | B1 * | 6/2001 | Frey | H02P 7/2913 318/257 |
| 6,901,704 | B2 * | 6/2005 | Sakaue | E05F 15/63 296/56 |
| 7,109,676 | B2 * | 9/2006 | Caussat | B60J 7/0573 180/280 |
| 7,151,350 | B2 * | 12/2006 | Haag | G01S 13/04 318/280 |
| 7,173,389 | B1 * | 2/2007 | Gagnon | H02H 7/0851 318/280 |
| 7,688,013 | B2 * | 3/2010 | Frommer | E05F 15/43 318/266 |
| 2012/0112677 | A1 * | 5/2012 | Egger | H02H 7/0851 318/453 |
| 2015/0096233 | A1 * | 4/2015 | Kojima | H02P 3/14 49/31 |

FOREIGN PATENT DOCUMENTS

| | | |
|---|---|---|
| DE | 199 01 840 A1 | 5/2000 |
| DE | 10 2006 038 447 A1 | 2/2008 |
| DE | 100 82 533 B4 | 10/2008 |
| DE | 10 2010 034 794 B3 | 9/2011 |
| DE | 10 2014 017 576.6 | 11/2014 |
| EP | 1 860 265 A2 | 11/2007 |
| EP | 2 610 692 A2 | 7/2013 |
| GB | 2 307 758 A | 6/1997 |
| WO | PCT/EP2015/002358 | 11/2015 |

OTHER PUBLICATIONS

International Search Report dated Mar. 22, 2016 from International Patent Application No. PCT/EP2015/002358, 3 pages.
Chinese Office Action dated Mar. 2, 2018, from Chinese Patent Application No. 201580064664.7, with English language translation of summary of Examiner's comments.
German Office Action dated Jul. 30, 2015, from German Patent Application No. 10 2014 017 576.6, 7 pages.
Chinese Office Action dated Sep. 11, 2018 from Chinese Patent Application No. 201580064664.7, with English language translation of summary of Examiner's comments, 7 pages total.

* cited by examiner

METHOD FOR OPERATING A MOVING DEVICE

CROSS REFERENCE TO RELATED APPLICATIONS

This application is a U.S. national stage of International Application No. PCT/EP2015/002358, filed on Nov. 24, 2015. The International Application claims the priority benefit of German Application No. 10 2014 017 576.6 filed on Nov. 27, 2014. Both the International Application and German Application are incorporated by reference herein in their entirety.

BACKGROUND

Described herein is a method for operating a moving device for a movable component of a motor vehicle. In addition, described herein is a motor vehicle having the moving device.

The automated movement of components between two end positions, in particular an opened position and a closed position, is an important comfort feature of modern motor vehicles. In this context, in particular tailgates, engine hoods and doors of any type are considered to be components. For this purpose, moving devices are used which have a drive unit which is frequently driven by an electric motor and may be embodied as an electric motor. At the start of the movement, the drive unit must apply a relatively large amount of energy here in order to overcome the inertia of the component and friction forces acting in the moving device. For this purpose, a fixed release energy which is to be applied is usually fed by the drive unit.

This fixedly predefined release energy generally causes the component to be able to be released in a largely jolt-free fashion from at least one of the end positions. However, in the case of starting positions between the end positions of the component perceptible jolting and oscillation of the component or other irregularities may occur and bring about irregularity of the overall movement. This loads the mechanism of the moving device unnecessarily and adversely affects the moving comfort of the component.

German Patent Application Publication 10 2006 038 447 A1 describes a method for opening and/or closing a flap of a motor vehicle by a drive, which is controlled by the control unit in such a way that the force which is respectively used to move the flap is at most a predefinable absolute value above the minimum force necessary for movement, depending on the angular position of the flap relative to the motor vehicle.

United Kingdom Patent Application Publication 2 307 758 A describes a flap control device including a flap which moves along a predefined path in order to cover an opening, and an actuator for moving the flap along the path between an open position and a closed position.

German Patent Application Publication 196 41 428 C1 describes a device for pivoting a hinged hood of a motor vehicle, composed of a hydraulic cylinder which is coupled in a hinged fashion to the vehicle body and to the hinged hood and by which the hood can be opened and closed.

SUMMARY

Described herein is a method for operating a moving device which permits the component to be released in a way which brings about little wear and tear in terms of material and generates a smooth movement sequence.

An aspect of the method described herein provides for a release energy for a drive unit of the moving device, which is to be used to release the movable component at a start of a movement of the movable component from a starting position, is selected as a function of the starting position. Subsequent to the release of the movable component, a further movement to an end position can be controlled in an open-loop or closed-loop manner by predefining a setpoint movement profile.

An aspect of the method described herein is to feed to the component in each case only such a quantity of release energy which is also actually required for release in its current starting position. The corresponding release energies may be predefined here at the works (e.g., at the manufacturer) and known to the method, in particular these values can be determined empirically. This can ensure that in any starting position only that release energy is applied by the drive unit which is required for smooth movement, with the result that, furthermore, the moving device and its parts such as bearings and gear mechanisms are protected against overloading. Consequently, the generation of excess energies, which result in irregularities of the movement, is avoided.

This method is expediently developed by virtue of the fact that the release energy which is to be used is additionally selected as a function of the direction of the movement. In particular in the case of movements which are executed counter to the force of gravity, it is relevant to take into account the moving direction. Therefore, a larger selection should be made for the release energy of two movements which are directed in different directions from the same starting position in the case of movement counter to the force of gravity acting on the component. As a result, the movement behavior of the moving device can be optimized even further.

In a further advantageous refinement there is provision that the release energy which is to be used is additionally selected as a function of at least one ambient parameter which describes the ambient conditions, in particular the ambient temperature and/or the ambient humidity. These external conditions can also have an influence on the release energy to be selected for a uniform movement sequence. Therefore, at very low ambient temperatures, in particular below freezing point, high friction forces which have to be overcome in the moving device are to be expected. These friction forces result, for example, from impaired sliding properties of lubricants used in this temperature range. Icing which occurs in conjunction with increased ambient humidity and which increases the release energy can also expediently be taken into account in the method at these temperatures.

One advantageous development of the method provides that at least one drive parameter which determines the release energy and/or the time profile of a release performance is selected from a characteristic curve diagram. It is, on the one hand, conceivable here that the characteristic curve diagram is modeled according to a formula and the method calculates the drive parameters on the basis thereof. On the other hand, the characteristic curve diagram can also be made available by using a fixed assignment in a look up table which is stored in a memory unit of the motor vehicle. It is possible to consider as a drive parameter any input variable of the drive unit which is used and which is intended to determine the energy or power to be output. In particular, the time period over which a particular release performance is output by the drive unit and the release performance itself are example drive parameters. This permits the release energy to be fed even more precisely by implementation of the methods.

This embodiment of the method can be improved by virtue of the fact that a pulse duty factor of a pulse width modulation and/or a period for which the pulse width modulation is to be applied are/is used as a drive parameter. Since the drive unit in a motor vehicle is frequently embodied as an electric motor, the electric motor is expediently actuated by using a pulse-width-modulated power signal. In this configuration, the method is particularly effective because the decisive actuation parameters relate to the pulse duty factor and/or the period for which the pulse width modulation is to be applied, and precise control of the drive unit is therefore made possible. Therefore, integration of the method according to the method described herein into known actuation methods can also easily be implemented since the pulse width modulation and the period thereof are often also actuation parameters which are used in other actuation processes. This applies, in particular, to a further movement profile which is subsequent to the feeding of the release energy, more details on which will be given below.

All the specified embodiments of the method can advantageously be supplemented by virtue of the fact that, subsequent to the release of the component, a further movement to the end position is open-loop or closed-loop controlled by predefining a setpoint movement profile, in particular a setpoint speed. The method can therefore also easily be integrated into known open-loop or closed-loop controlled concepts for the operation of moving devices. As a result, the movement profile which is subsequent to the feeding of the release energy no longer has to be predefined in such a way that it attempts to overcome friction forces or mass inertia but instead can be configured directly for the desired movement profile. This facilitates the open-loop or closed-loop control of the further movement to the end position since precisely that release energy which was necessary for uniform movement from a resting position has been previously fed to the drive unit. This facilitates, in particular, a stable configuration of technical control measures considerably, since, for example, movement irregularities such as oscillation of the component are very largely eliminated by the method described herein.

In addition, a tailgate may be used as a component and a larger amount of release energy is used in a position of maximum opening of the tailgate than in an intermediate position. Particularly when a tailgate closes, it has proven appropriate to reduce the release energy to be fed as the angle of aperture decreases. A characteristic curve diagram of the release energy plotted against the angle of aperture of the tailgate then has a falling profile. Particularly in the case of automatically moved tailgates, a smooth movement sequence is of particular interest because the movement is not only perceived by the driver from the passenger compartment of the vehicle but can also be noticed by persons standing around in the vicinity. A uniform movement sequence of the tailgate constitutes an important comfort feature and quality feature of the motor vehicle in its entirety here.

Also described herein is a motor vehicle having the movable component, moving device, and control unit described herein. All the embodiments of the method can be analogously transferred to the motor vehicle, with the result that the advantages already mentioned can also be achieved therewith. For example, the control unit executes the method for moving a tailgate which is attached to the vehicle.

BRIEF DESCRIPTION OF THE DRAWINGS

These and other aspects and advantages will become more apparent and more readily appreciated from the following description of the exemplary embodiments described below taken in conjunction with the accompanying drawings in which.

DETAILED DESCRIPTION OF THE PREFERRED EMBODIMENT

Figure 1:
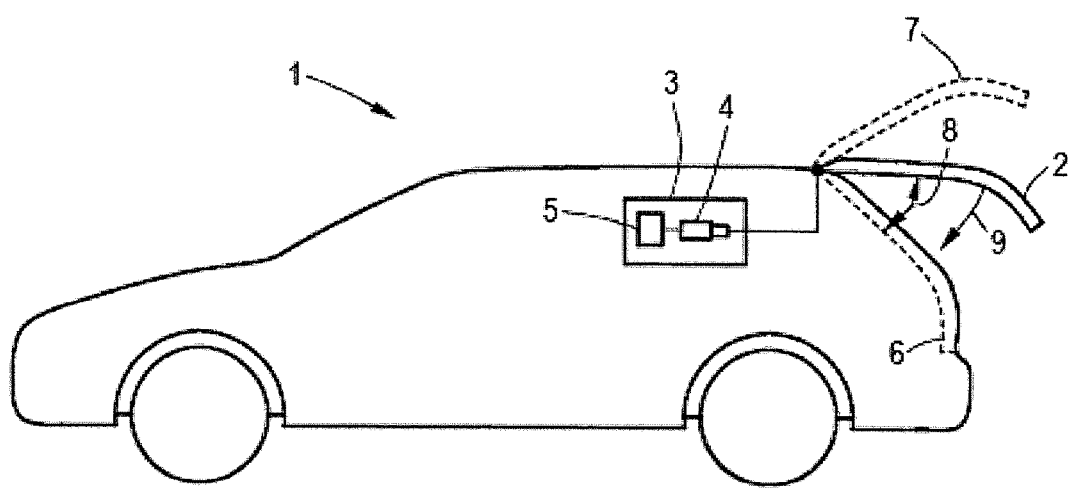
FIG. 1 is a basic outline of a motor vehicle described herein in a side view.

Reference will now be made in detail to the preferred embodiments, examples of which are illustrated in the accompanying drawings, wherein like reference numerals refer to like elements throughout.

FIG. 1 shows, in the form of a basic outline, a motor vehicle 1 with a tailgate 2 and a moving device 3 including a drive unit 4 which is controlled by a control unit 5. In addition, the tailgate 2 is shown in outline in a closed position 6 and in a position 7 of maximum opening, wherein the illustrated position of the tailgate 2 is the starting position here. The positions 6, 7 are at the same time end positions here. In addition, an angle of inclination 8 of the tailgate 2 is denoted.

Figure 2:
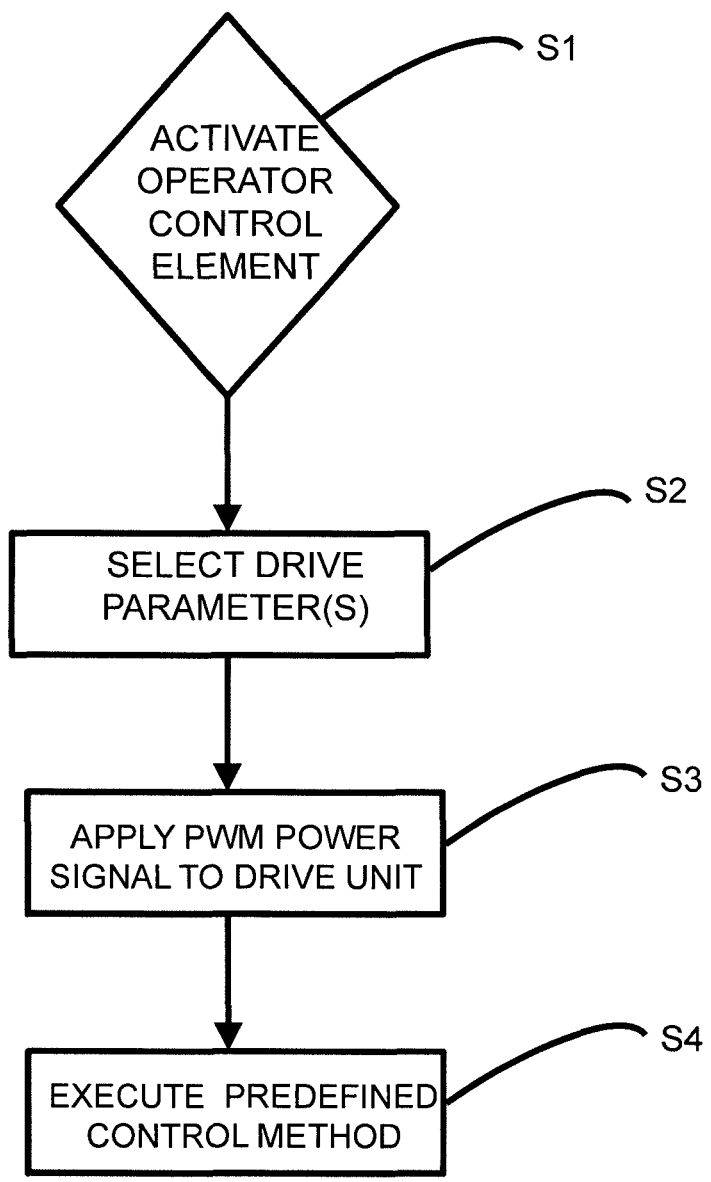
FIG. 2 is a flowchart of an exemplary embodiment of the method described herein.

FIG. 2 shows a flowchart of an exemplary embodiment of the method described herein. An operation S1 denotes here the start of the method if a movement of the tailgate 2 is to be executed, for example by activation of an operator control element. In operation S2, the drive parameters are then selected as a function of the current angle of inclination 8 which represents the starting position and a desired direction 9 of the movement. In the present case, this can be implemented, for example, by virtue of the fact that in each case a look up table for two different directions 9 is stored in the control unit 5, which look up table assigns drive parameters to different intervals of angles of inclination 8. The exemplary embodiment is selected here in such a way that the drive unit 4 is actuated by pulse-width-modulated power signals. At the given angle of inclination 8 and with the desired direction 9 an appropriate combination of drive parameters would constitute a pulse duty factor of the pulse width modulation of 45% and a duration of the application of this pulse duty factor of 200 ms. If the tailgate 2 is located in a position 7 of maximum aperture thereof, a suitable combination of drive parameters could be e.g. a pulse duty factor of 90% given a duration of 600 ms.

The pulse width modulated power signal which is defined by this combination of drive parameters is fed to the drive unit 4 in operation S3. The release energy which is matched to the angle of inclination 8 and the desired direction 9 and results from the power signal is therefore transmitted as quickly as possible to the tailgate 2 without delays occurring, which arise, e.g., in the case of a movement sequence which is completely adjusted to a setpoint value.

After the expiry of the period of the pulse width modulated power signal which is predefined as a drive parameter, a suitable open-loop or closed-loop control method is executed for the further movement of the tailgate 2 into its end position in operation S4. A profile, dependent in turn on the angle of inclination 8, of the pulse duty factor which represents the speed of the tailgate 2 is predefined for this.

Figure 3:
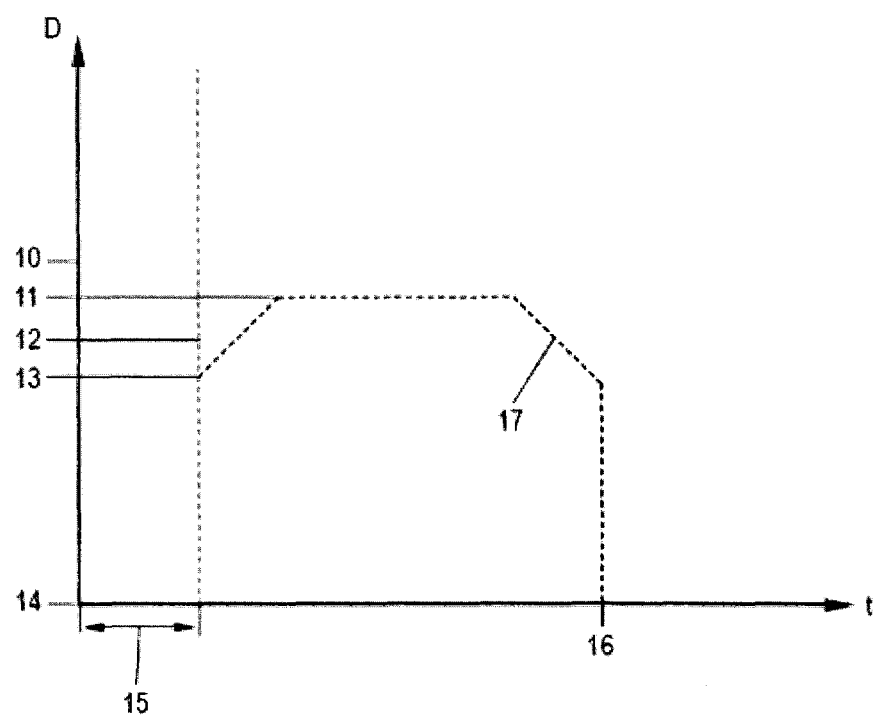
FIG. 3 is a diagram of a pulse duty factor determined by the method, and a subsequent profile of the pulse duty factor plotted over time.

FIG. 3 shows a diagram with an exemplary time profile of a release pulse duty factor 12 which results from the application of the method as well as a further pulse duty factor 17 which is predefined within the scope of open-loop or closed-loop control measures, neither of which exceeds a maximum pulse duty factor 10 of 100%. In this context, at the starting point 14 of the method, the release pulse duty factor 12 which is present at the drive unit 4 for the duration 15 is predefined. Afterwards, the pulse duty factor 17 which starts with a minimum factor 13 and rises linearly to a nominal pulse duty factor 11 and remains constant there is predefined. In the vicinity of the end position, the pulse duty factor 17 then drops again to the minimum factor 13, in order to finally to assume a dead center point 16 at zero. Irregularities are therefore prevented over the entire movement and a movement of the tailgate 2 into the end position which is experienced as smooth is achieved.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating a moving device for a movable component of a motor vehicle, the movable component being movable between first and second end positions by a drive unit of the moving device, the method comprising:
    selecting a release energy for the drive unit, which is to be used to release the movable component at a start of a movement of the movable component from a starting position disposed between the first and second end positions, as a function of the starting position;
    releasing the movable component from the starting position based on the release energy selected; and
    subsequent to the release of the movable component, controlling a further movement of the movable component to one of the first and second end positions in an open-loop or closed-loop manner by predefining a setpoint movement profile,
    wherein
    the movable component is stationary at the starting position before the movable component is released from the starting position,
    at least one drive parameter which determines at least one of the release energy and a time profile of a release performance is selected from a characteristic curve diagram, and
    the at least one drive parameter includes at least one of a pulse duty factor of a pulse width modulation and a period for which the pulse width modulation is to be applied.

2. The method as claimed in claim 1, wherein the movable component is a tailgate of the motor vehicle.

3. The method as claimed in claim 1, wherein the release energy which is to be used is additionally selected as a function of the direction of the movement.

4. The method as claimed in claim 1, wherein the release energy which is to be used is additionally selected as a function of at least one ambient parameter which describes at least one ambient condition.

5. The method as claimed in claim 4, wherein the at least one ambient condition includes at least one of an ambient temperature of air and an ambient humidity of air.

6. The method as claimed in claim 1, wherein a setpoint speed is predefined as the setpoint movement profile.

7. The method as claimed in claim 1, wherein the movable component is a tailgate of the motor vehicle, the first end position corresponds to a position of maximum opening of the tailgate,
    the second end position corresponds to a position minimum opening of the tailgate, and
    the release energy selected to release the tailgate from the starting position is less than a release energy selected to release the tailgate from the first end position.

8. A motor vehicle, comprising:
    a movable component;
    a moving device including a drive unit configured to move the movable component between first and second end positions; and
    a control unit configured to:
        select a release energy for the drive unit, which is to be used to release the movable component at a start of a movement of the movable component from a starting position disposed between the first and second end positions, as a function of the starting position,
        control the release of the movable component from the starting position based on the release energy selected, and
        subsequent to the release of the movable component, control a further movement of the movable component to one of the first and second end positions in an open-loop or closed-loop manner by predefining a setpoint movement profile,
    wherein
    the movable component is stationary at the starting position before the movable component is released from the starting position,
    the control unit uses at least one drive parameter to determine the release energy and a time profile of a release performance, the at least one drive parameter including a first predefined pulse duty factor which is maintained for a first predefined period of time, and
    the control unit uses at least one further drive parameter to control the further movement of the movable component, the at least one further drive parameter including a second predefined pulse duty factor, greater than the first predefined pulse duty factor, which is maintained for a second predefined period of time.

9. The motor vehicle as claimed in claim 8, wherein the movable component is a tailgate.

10. The motor vehicle as claimed in claim 8, further comprising a memory to store a look up table having the at least one drive parameter which determines the release energy and the time profile of the release performance,
    wherein the control unit is configured to select the release energy for the drive unit using the look up table.

11. The motor vehicle as claimed in claim 8, wherein
    the first end position is a fully open position of the movable component,
    the second end position is a fully closed position of the movable component,
    the starting position is a first intermediate position having a first angle of inclination defined as an angle between the starting position and the second end position, and
    when the movable component is to move to the fully closed position from the first intermediate position, the release energy for the drive unit is selected by the control unit as a function of the first angle of inclination.

12. The motor vehicle as claimed in claim 11, wherein when a starting position of the movable component is a second intermediate position having a second angle of inclination which is less than the first angle of inclination, the control unit is configured to select a release energy for the drive unit which is less than the release energy selected by the control unit for the drive unit when the starting position of the movable component is the first intermediate position having the first angle of inclination.

13. The motor vehicle as claimed in claim 8, wherein the release energy for the drive unit selected by the control unit when the starting position is closer to the first end position than the second end position is greater than the release energy for the drive unit selected by the control unit when the starting position is closer to the second end position than the first end position.

14. A motor vehicle, comprising:
a movable component;
a moving device including a drive unit configured to move the movable component between first and second end positions; and
a control unit configured to:
    select a release energy for the drive unit, which is to be used to release the movable component at a start of a movement of the movable component from a starting position disposed between the first and second end positions, as a function of the starting position,
    control the release of the movable component from the starting position based on the release energy selected, and
    subsequent to the release of the movable component, control a further movement of the movable component to one of the first and second end positions in an open-loop or closed-loop manner by predefining a setpoint movement profile,
wherein
the movable component is stationary at the starting position before the movable component is released from the starting position,
the first end position is a fully open position of the movable component,
the second end position is a fully closed position of the movable component,
the starting position is a first intermediate position having a first angle of inclination defined as an angle between the starting position and the second end position,
when the movable component is to move to the fully closed position from the first intermediate position, the release energy for the drive unit is selected by the control unit as a function of the first angle of inclination,
the control unit is configured to use at least one drive parameter to determine the release energy, the at least one drive parameter including a predefined pulse duty factor, and
the control unit is configured to use a first predefined pulse duty factor to release the movable component from the first intermediate position which is less than a second predefined pulse duty factor used by the control unit to release the movable component from the fully open position.

15. The motor vehicle as claimed in claim 14, wherein
the control unit is configured to maintain the first predefined pulse duty factor used by the control unit to release the movable component from the first intermediate position for a first predefined period of time,
the control unit is configured to maintain the second predefined pulse duty factor used by the control unit to release the movable component from the fully open position for a second predefined period of time, and
the first predefined period of time is less than the second predefined period of time.

16. The motor vehicle as claimed in claim 15, wherein
when the first predefined period of time expires the control unit is configured to linearly increase the first predefined pulse duty factor until a nominal pulse duty factor is reached, and
the control unit is configured to maintain the nominal pulse duty factor until the movable component reaches one of the fully open position and the fully closed position.

* * * * *